US012260609B2

(12) United States Patent
Wu et al.

(10) Patent No.: US 12,260,609 B2
(45) Date of Patent: Mar. 25, 2025

(54) BEHAVIOR RECOGNITION METHOD AND SYSTEM, ELECTRONIC DEVICE AND COMPUTER-READABLE STORAGE MEDIUM

(71) Applicant: LYNXI TECHNOLOGIES CO., LTD., Beijing (CN)

(72) Inventors: Zhenzhi Wu, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 392 days.

(21) Appl. No.: 17/790,694

(22) PCT Filed: Mar. 8, 2021

(86) PCT No.: PCT/CN2021/079530
§ 371 (c)(1),
(2) Date: Jul. 1, 2022

(87) PCT Pub. No.: WO2021/180030
PCT Pub. Date: Sep. 16, 2021

(65) Prior Publication Data
US 2023/0042187 A1    Feb. 9, 2023

(30) Foreign Application Priority Data
Mar. 9, 2020 (CN) .......................... 202010157538.9

(51) Int. Cl.
*G06V 10/62* (2022.01)
*G06T 7/269* (2017.01)
(Continued)

(52) U.S. Cl.
CPC .............. *G06V 10/62* (2022.01); *G06T 7/269* (2017.01); *G06V 10/40* (2022.01);
(Continued)

(58) Field of Classification Search
CPC .... G06V 10/62; G06V 10/40; G06V 10/7715; G06V 10/80; G06V 10/82; G06V 20/46;
(Continued)

(56) References Cited

U.S. PATENT DOCUMENTS

2017/0132785 A1    5/2017    Wshah

FOREIGN PATENT DOCUMENTS

| CN | 108492319 A | 9/2018 |
| CN | 109377555 A * | 2/2019 ........... G06K 9/6277 |

(Continued)

OTHER PUBLICATIONS

Huang, Ensembling 3D CNN Framework for Video Recognition, IJCNN 2019. International Joint Conference on Neural Networks. Budapest, Hungary. Jul. 14-19, 2019 (Year: 2019).*
(Continued)

*Primary Examiner* — Vu Le
*Assistant Examiner* — Lei Zhao
(74) *Attorney, Agent, or Firm* — Li & Cai Intellectual Property (USA) Office

(57) ABSTRACT

A behavior recognition method and system, including: dividing video data into a plurality of video clips, performing frame extraction processing on each video clip to obtain frame images, and performing optical flow extraction on the frame images to obtain optical flow images; performing feature extraction on the frame images and the optical flow images to obtain feature maps of the frame images and the optical flow images; performing spatio-temporal convolution processing on the feature maps of the frame images and the optical flow images, and determining a spatial prediction result and a temporal prediction result; fusing the spatial prediction results of all the video clips to obtain a spatial fusion result, and fusing the temporal prediction results of all the video clips to obtain a temporal fusion result; and
(Continued)

performing two-stream fusion on the spatial fusion result and the temporal fusion result to obtain a behavior recognition result.

18 Claims, 4 Drawing Sheets

(51) Int. Cl.
| | |
|---|---|
| *G06V 10/40* | (2022.01) |
| *G06V 10/77* | (2022.01) |
| *G06V 10/80* | (2022.01) |
| *G06V 10/82* | (2022.01) |
| *G06V 20/40* | (2022.01) |

(52) U.S. Cl.
CPC .......... *G06V 10/7715* (2022.01); *G06V 10/80* (2022.01); *G06V 10/82* (2022.01); *G06V 20/46* (2022.01); *G06V 20/49* (2022.01); *G06T 2207/10016* (2013.01); *G06T 2207/20084* (2013.01)

(58) Field of Classification Search
CPC ...... G06V 20/49; G06V 10/454; G06T 7/269; G06T 2207/10016; G06T 2207/20084; G06T 2207/20081; G06T 7/246; Y02D 10/00; G06N 3/04; G06N 3/08; G06N 3/045; G06F 18/2415; G06F 18/25; G06F 18/241
See application file for complete search history.

(56) References Cited

FOREIGN PATENT DOCUMENTS

| | | | |
|---|---|---|---|
| CN | 109711338 A | 5/2019 | |
| CN | 110826447 A * | 2/2020 | |
| CN | 110826475 A * | 2/2020 | ......... G06K 9/00711 |
| WO | WO-2017214968 A1 * | 12/2017 | |

OTHER PUBLICATIONS

Srinivasan, ReStoCNet: Residual Stochastic Binary Convolutional Spiking Neural Network for Memory-Efficient Neuromorphic Computing, Front. Neurosci., Mar. 18, 2019 (Year: 2019).*
WIPO, International Search Report issued on May 21, 2021.
China Patent Office, CN202010157538.9 First Office Action issued on Jul. 19, 2023.

* cited by examiner

BEHAVIOR RECOGNITION METHOD AND SYSTEM, ELECTRONIC DEVICE AND COMPUTER-READABLE STORAGE MEDIUM

CROSS-REFERENCE TO RELATED APPLICATIONS

The present application is a National Phase application filed under 35 U.S.C. 371 as a national stage of PCT/CN2021/079530, filed on Mar. 8, 2021, an application claiming priority from Chinese Patent Application No. 202010157538.9, filed on Mar. 9, 2020 in the Chinese Intellectual Property Office, contents of which are hereby incorporated herein by reference in their entirety.

TECHNICAL FIELD

The present disclosure relates to the field of behavior recognition technology, and in particular, to a behavior recognition method, a behavior recognition system, an electronic device, and a computer-readable storage medium.

BACKGROUND

Behavior recognition based on video data is widely applied in various fields. However, behavior recognition based on video data in the related art has problems of large calculation amount, large weight, and low recognition accuracy.

SUMMARY

In order to solve the above problems, the present disclosure provides a behavior recognition method, a behavior recognition system, an electronic device, and a computer-readable storage medium, which not only can produce a convolution effect in an Artificial Neural Network (ANN) and reduce the calculation amount and the weight, but also can associate a plurality of pictures for processing of time series information thereamong, thereby improving recognition accuracy.

The present disclosure provides a behavior recognition method, including: dividing video data into a plurality of video clips, performing frame extraction processing on each video clip to obtain a plurality of frame images, and performing optical flow extraction on the plurality of frame images of each video clip obtained after the frame extraction to obtain optical flow images of each video clip; respectively performing feature extraction on the frame images and the optical flow images of each video clip to obtain feature maps of the frame images of each video clip and feature maps of the optical flow images of each video clip; respectively performing spatio-temporal convolution processing on the feature maps of the frame images of each video clip and the feature maps of the optical flow images of each video clip, and determining a spatial prediction result and a temporal prediction result of each video clip; fusing the spatial prediction results of all the video clips to obtain a spatial fusion result, and fusing the temporal prediction results of all the video clips to obtain a temporal fusion result; and performing two-stream fusion on the spatial fusion result and the temporal fusion result to obtain a behavior recognition result.

As a further improvement in the present disclosure, respectively performing the spatio-temporal convolution processing on the feature maps of the frame images of each video clip and the feature maps of the optical flow images of each video clip, and determining the spatial prediction result and the temporal prediction result of each video clip includes: respectively performing time series feature extraction on the feature maps of the frame images of each video clip and the feature maps of the optical flow images of each video clip for n times to obtain a first eigenvector, with n being a positive integer; performing matrix transformation processing on the first eigenvector to obtain a second eigenvector; performing time series full-connection processing on the second eigenvector to obtain a third eigenvector; and determining the spatial prediction result and the temporal prediction result of each video clip according to the third eigenvector.

As a further improvement in the present disclosure, when n=1, respectively performing time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain a first temporal convolution vector; performing pooling processing on the first temporal convolution vector to obtain a first intermediate eigenvector; and determining the first intermediate eigenvector as the first eigenvector, when n=2, respectively performing time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain the first temporal convolution vector; performing pooling processing on the first temporal convolution vector to obtain the first intermediate eigenvector; performing temporal convolution processing on the first intermediate eigenvector to obtain a second temporal convolution vector; performing pooling processing on the second temporal convolution vector to obtain a second intermediate eigenvector; and determining the second intermediate eigenvector as the first eigenvector, when n>2, respectively performing time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain the first temporal convolution vector; performing pooling processing on the first temporal convolution vector to obtain the first intermediate eigenvector; performing temporal convolution processing on the first intermediate eigenvector to obtain the second temporal convolution vector; performing pooling processing on an $i^{th}$ temporal convolution vector to obtain an $i^{th}$ intermediate eigenvector; performing temporal convolution processing on the $i^{th}$ intermediate eigenvector to obtain a $(i+i)^{th}$ temporal convolution vector; performing pooling processing on the $(i+1)^{th}$ temporal convolution vector to obtain a $(i+1)^{th}$ intermediate eigenvector, and so on, until an $n^{th}$ intermediate eigenvector is obtained, with i being a positive integer sequentially taken from 2 to (n−1); and determining the $n^{th}$ intermediate eigenvector as the first eigenvector.

As a further improvement in the present disclosure, performing frame extraction processing on each video clip includes: extracting frames from each video clip with a certain interval to obtain $N_1$ frames of images, with the interval being obtained by dividing the total number of frames of the video clip by $N_1$, and $N_1$ being an integer greater than 1.

As a further improvement in the present disclosure, performing optical flow extraction on the plurality of frame images of each video clip includes: for the extracted $N_1$ frames of images, respectively performing optical flow extraction and calculation on every two adjacent frame images to obtain ($N_1-1$) optical flows; and copying an optical flow of a second frame and a first frame as a first optical flow, and combining the first optical flow with the ($N_1-1$) optical flows to obtain $N_1$ optical flows.

As a further improvement in the present disclosure, respectively performing spatio-temporal convolution processing on the feature maps of the frame images of each video clip and the feature maps of the optical flow images of each video clip is implemented by a neural network, and the method further includes: training the neural network according to a training set.

As a further improvement in the present disclosure, the neural network includes: n Blocks, a Reshape layer, an LIF layer, a fully connected layer and a Softmax layer, and each Block includes a ConvLIF layer and a pooling layer, which are cascaded, n is a positive integer and satisfies n≥1, and then Blocks are cascaded when n>1.

As a further improvement in the present disclosure, respectively performing spatio-temporal convolution processing on the feature maps of the frame images of each video clip and the feature maps of the optical flow images of each video clip with the neural network includes: performing, by the n Blocks, time series feature extraction on the feature maps of the frame images of each video clip and the feature maps of the optical flow images of each video clip for n times to obtain a first eigenvector, with n being a positive integer; performing, by the Reshape layer, matrix transformation processing on the first eigenvector to obtain a second eigenvector; performing, by the LIF layer and the fully connected layer, time series full-connection processing on the second eigenvector to obtain a third eigenvector; and determining, by the Softmax layer, the spatial prediction result and the temporal prediction result of each video clip according to the third eigenvector.

As a further improvement in the present disclosure, when n=1, performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain a first temporal convolution vector; performing, by the pooling layer, pooling processing on the first temporal convolution vector to obtain a first intermediate eigenvector; and determining the first intermediate eigenvector as the first eigenvector, when n=2, performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain the first temporal convolution vector; performing, by the pooling layer, pooling processing on the first temporal convolution vector to obtain the first intermediate eigenvector; performing, by the ConvLIF layer, temporal convolution processing on the first intermediate eigenvector to obtain a second temporal convolution vector; performing, by the pooling layer, pooling processing on the second temporal convolution vector to obtain a second intermediate eigenvector; and determining the second intermediate eigenvector as the first eigenvector, when n>2, performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain the first temporal convolution vector; performing, by the pooling layer, pooling processing on the first temporal convolution vector to obtain the first intermediate eigenvector; performing, by the ConvLIF layer, temporal convolution processing on the first intermediate eigenvector to obtain the second temporal convolution vector; performing, by the pooling layer, pooling processing on an $i^{th}$ temporal convolution vector to obtain an $i^{th}$ intermediate eigenvector; performing, by the ConvLIF layer, temporal convolution processing on the $i^{th}$ intermediate eigenvector to obtain a $(i+1)^{th}$ temporal convolution vector; performing, by the pooling layer, pooling processing on the $(i+1)^{th}$ temporal convolution vector to obtain a $(i+1)^{th}$ intermediate eigenvector, and so on, until an $n^{th}$ intermediate eigenvector is obtained, with i being a positive integer sequentially taken from 2 to (n−1); and determining the $n^{th}$ intermediate eigenvector as the first eigenvector.

As a further improvement in the present disclosure, each Block further includes: a Batch Normalization (BN) layer cascaded between the ConvLIF layer and the pooling layer. When n=1 or n=2, performing, by the pooling layer, pooling processing on the first temporal convolution vector to obtain the first intermediate eigenvector includes: performing, by the BN layer, normalizing processing on the first temporal convolution vector; and performing, by the pooling layer, pooling processing on the normalized first temporal convolution vector.

When n=2, performing, by the pooling layer, pooling processing on the second temporal convolution vector to obtain the second intermediate eigenvector includes: performing, by the BN layer, normalizing processing on the second temporal convolution vector; and performing, by the pooling layer, pooling processing on the normalized second temporal convolution vector.

When n>2, performing, by the pooling layer, pooling processing on the first temporal convolution vector to obtain the first intermediate eigenvector includes: performing, by the BN layer, normalizing processing on the first temporal convolution vector; and performing, by the pooling layer, pooling processing on the normalized first temporal convolution vector to obtain the first intermediate eigenvector.

When n>2, performing, by the pooling layer, pooling processing on the $i^{th}$ temporal convolution vector to obtain the $i^{th}$ intermediate eigenvector includes: performing, by the BN layer, normalizing processing on the $i^{th}$ temporal convolution vector; and performing, by the pooling layer, pooling processing on the normalized $i^{th}$ temporal convolution vector to obtain the $i^{th}$ intermediate eigenvector.

As a further improvement in the present disclosure, the LIF layer is configured to: determine a membrane potential value $U_m^t$ at a moment t according to a value $I^t$, which is obtained by fully connected operation on an input value $X^t$ at the moment t, and a biological voltage value $V_m^{t-1}$ at a moment (t−1); determine an output value $F^t$ at the moment t according to the membrane potential value $U_m^t$ at the moment t and a transmission threshold $V_{th}$; determine whether to reset a membrane potential according to the output value $F^t$ at the moment t, and determine a reset membrane potential value $R_m^t$ according to a reset voltage value $V_{reset}$; and determine a biological voltage value $V_m^t$ at the moment t according to the reset membrane potential value $R_m^t$; where the output value $F^t$ at the moment t is used as an input into a following layer cascaded with the LIF layer, and the biological voltage value $V_m^t$ at the moment t is used as an input for calculating the membrane potential value at a moment (t+1).

As a further improvement in the present disclosure, the ConvLIF layer is configured to: determine a membrane potential value $U_m^t$ at a moment t according to a value $I^t$, which is obtained by convolution operation or fully connected operation on an input value $X^t$ at the moment t, and a biological voltage value $V_m^{t-1}$ at a moment (t−1); determine an output value $F^t$ at the moment t according to the membrane potential value $U_m^t$ at the moment t and a transmission threshold $V_{th}$; determine whether to reset a membrane potential according to the output value $F^t$ at the moment t, and determine a reset membrane potential value $R_m^t$ according to a reset voltage value $V_{reset}$; and determine a biological voltage value $V_m^t$ at the moment t according to the reset membrane potential value $R_m^t$; where the output value $F^t$ at the moment t is used as an input into a following layer cascaded with the ConvLIF layer, and the biological voltage value $V_m^t$ at the moment t is used as an input for calculating the membrane potential value at a moment (t+1).

As a further improvement of the present disclosure, determining the output value $F^t$ at the moment t according to the membrane potential value $U_m^t$ at the moment t and the transmission threshold $V_{th}$ includes: in a case where the membrane potential value $U_m^t$ at the moment t is greater than or equal to the transmission threshold $V_{th}$, determining that the output value $F^t$ at the moment t is 1; and in a case where the membrane potential value $U_m^t$ at the moment t is less than the transmission threshold $V_{th}$, determining that the output value $F^t$ at the moment t is 0.

As a further improvement of the present disclosure, determining the biological voltage value $V_m^t$ at the moment t according to the reset membrane potential value $R_m^t$ includes: calculating the reset membrane potential value $R_m^t$ by a Leak activation function, and determining the biological voltage value $V_m^t$ at the moment t.

As a further improvement of the present disclosure, when the spatial prediction results of all the video clips are fused and the temporal prediction results of all the video clips are fused, the prediction results of all the video clips are subjected to one of the following: direct averaging, linear weighting, direct taking of a maximum value, and TOP-K weighting.

As a further improvement of the present disclosure, when the spatial fusion result and the temporal fusion result are subjected to two-stream fusion, the spatial fusion result and the temporal fusion result are weighted fused.

The present disclosure further provides a behavior recognition system adopting the behavior recognition method, including: a data preprocessing module configured to divide video data into a plurality of video clips, perform frame extraction processing on each video clip to obtain a plurality of frame images, and perform optical flow extraction on the plurality of frame images of each video clip to obtain a plurality of optical flow images of each video clip; a feature extraction module configured to respectively perform feature extraction on the frame images and the optical flow images of each video clip to obtain feature maps of the frame images of each video clip and feature maps of the optical flow images of each video clip; a network identification module configured to respectively perform spatio-temporal convolution processing on the feature maps of the frame images of each video clip and the feature maps of the optical flow images of each video clip, and determine a spatial prediction result and a temporal prediction result of each video clip; a network fusion module configured to fuse the spatial prediction results of all the video clips to obtain a spatial fusion result, and fuse the temporal prediction results of all the video clips to obtain a temporal fusion result; and a two-stream fusion module configured to perform two-stream fusion on the spatial fusion result and the temporal fusion result to obtain a behavior recognition result.

As a further improvement of the present disclosure, respectively performing, by the network identification module, spatio-temporal convolution processing on the feature maps of the frame images of each video clip and the feature maps of the optical flow images of each video clip, and determining the spatial prediction result and the temporal prediction result of each video clip includes: respectively performing time series feature extraction on the feature maps of the frame images of each video clip and the feature maps of the optical flow images of each video clip for n times to obtain a first eigenvector, with n being a positive integer; performing matrix transformation processing on the first eigenvector to obtain a second eigenvector; performing time series full-connection processing on the second eigenvector to obtain a third eigenvector; and determining the spatial prediction result and the temporal prediction result of each video clip according to the third eigenvector.

As a further improvement of the present disclosure, when n=1, respectively performing, by the network identification module, time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain a first temporal convolution vector; performing pooling processing on the first temporal convolution vector to obtain a first intermediate eigenvector; and determining the first intermediate eigenvector as the first eigenvector, when n=2, respectively performing, by the network identification module, time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain the first temporal convolution vector; performing pooling processing on the first temporal convolution vector to obtain the first intermediate eigenvector; performing temporal convolution processing on the first intermediate eigenvector to obtain a second temporal convolution vector; performing pooling processing on the second temporal convolution vector to obtain a second intermediate eigenvector; and determining the second intermediate eigenvector as the first eigenvector, when n>2, respectively performing, by the network identification module, time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain the first temporal convolution vector; performing pooling processing on the first temporal convolution vector to obtain the first intermediate eigenvector; performing temporal convolution processing on the first intermediate eigenvector to obtain the second temporal convolution vector; performing pooling processing on an $i^{th}$ temporal convolution vector to obtain an $i^{th}$ intermediate eigenvector; performing temporal convolution processing on the $i^{th}$ intermediate eigenvector to obtain a $(i+1)^{th}$ temporal convolution vector; performing pooling processing on the $(i+1)^{th}$ temporal convolution vector to obtain a $(i+1)^{th}$ intermediate eigenvector, and so on, until an $n^{th}$ intermediate eigenvector is obtained, with i being a positive integer sequentially taken from 2 to $(n-1)$; and determining the $n^{th}$ intermediate eigenvector as the first eigenvector.

As a further improvement of the present disclosure, performing, by the data preprocessing module, frame extraction processing on each video clip includes: extracting frames from each video clip with a certain interval to obtain $N_1$ frames of images, with the interval being obtained by dividing the total number of frames of the video clip by $N_1$, and $N_1$ being an integer greater than 1.

As a further improvement of the present disclosure, performing, by the data preprocessing module, optical flow extraction on the plurality of frame images of each video clip includes: for the extracted $N_1$ frames of images, respectively performing optical flow extraction and calculation on every two adjacent frame images to obtain $(N_1-1)$ optical flows; and copying an optical flow of a second frame and a first frame as a first optical flow, and combining the first optical flow with the $(N_1-1)$ optical flows to obtain $N_1$ optical flows.

As a further improvement of the present disclosure, respectively performing, by the network identification module, spatio-temporal convolution processing on the feature maps of the frame images of each video clip and the feature maps of the optical flow images of each video clip is implemented by a neural network, and the neural network is trained according to a training set.

As a further improvement of the present disclosure, the neural network includes: n Blocks, a Reshape layer, an LIF layer, a fully connected layer and a Softmax layer, and each Block includes a ConvLIF layer and a pooling layer, which are cascaded, n is a positive integer and satisfies n≥1, and then Blocks are cascaded when n>1.

As a further improvement of the present disclosure, respectively performing spatio-temporal convolution processing on the feature maps of the frame images of each video clip and the feature maps of the optical flow images of each video clip with the neural network includes: performing, by the n Blocks, time series feature extraction on the feature maps of the frame images of each video clip and the feature maps of the optical flow images of each video clip for n times to obtain a first eigenvector, with n being a positive integer; performing, by the Reshape layer, matrix transformation processing on the first eigenvector to obtain a second eigenvector; performing, by the LIF layer and the fully connected layer, time series full-connection processing on the second eigenvector to obtain a third eigenvector; and determining, by the Softmax layer, the spatial prediction result and the temporal prediction result of each video clip according to the third eigenvector.

As a further improvement of the present disclosure, when n=1, performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain a first temporal convolution vector; performing, by the pooling layer, pooling processing on the first temporal convolution vector to obtain a first intermediate eigenvector; and determining the first intermediate eigenvector as the first eigenvector, when n=2, performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain the first temporal convolution vector; performing, by the pooling layer, pooling processing on the first temporal convolution vector to obtain the first intermediate eigenvector; performing, by the ConvLIF layer, temporal convolution processing on the first intermediate eigenvector to obtain a second temporal convolution vector; performing, by the pooling layer, pooling processing on the second temporal convolution vector to obtain a second intermediate eigenvector; and determining the second intermediate eigenvector as the first eigenvector, when n>2, performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain the first temporal convolution vector; performing, by the pooling layer, pooling processing on the first temporal convolution vector to obtain the first intermediate eigenvector; performing, by the ConvLIF layer, temporal convolution processing on the first intermediate eigenvector to obtain the second temporal convolution vector; performing, by the pooling layer, pooling processing on an $i^{th}$ temporal convolution vector to obtain an $i^{th}$ intermediate eigenvector; performing, by the ConvLIF layer, temporal convolution processing on the $i^{th}$ intermediate eigenvector to obtain a $(i+1)^{th}$ temporal convolution vector; performing, by the pooling layer, pooling processing on the $(i+1)^{th}$ temporal convolution vector to obtain a $(i+1)^{th}$ intermediate eigenvector, and so on, until an $n^{th}$ intermediate eigenvector is obtained, with i being a positive integer sequentially taken from 2 to $(n-1)$; and determining the $n^{th}$ intermediate eigenvector as the first eigenvector.

As a further improvement of the present disclosure, each Block further includes a BN layer cascaded between the ConvLIF layer and the pooling layer.

When n=1 or n=2, performing, by the pooling layer, pooling processing on the first temporal convolution vector to obtain the first intermediate eigenvector includes: performing, by the BN layer, normalizing processing on the first temporal convolution vector; and performing, by the pooling layer, pooling processing on the normalized first temporal convolution vector.

When n=2, performing, by the pooling layer, pooling processing on the second temporal convolution vector to obtain the second intermediate eigenvector includes: performing, by the BN layer, normalizing processing on the second temporal convolution vector; and performing, by the pooling layer, pooling processing on the normalized second temporal convolution vector.

When n>2, performing, by the pooling layer, pooling processing on the first temporal convolution vector to obtain the first intermediate eigenvector includes: performing, by the BN layer, normalizing processing on the first temporal convolution vector; and performing, by the pooling layer, pooling processing on the normalized first temporal convolution vector to obtain the first intermediate eigenvector.

When n>2, performing, by the pooling layer, pooling processing on the $i^{th}$ temporal convolution vector to obtain the $i^{th}$ intermediate eigenvector includes: performing, by the BN layer, normalizing processing on the $i^{th}$ temporal convolution vector; and performing, by the pooling layer, pooling processing on the normalized $i^{th}$ temporal convolution vector to obtain the $i^{th}$ intermediate eigenvector.

As a further improvement of the present disclosure, the LIF layer is configured to: determine a membrane potential value $U_m^t$ at a moment t according to a value $I^t$, which is obtained by fully connected operation on an input value $X^t$ at the moment t, and a biological voltage value $V_m^{t-1}$ at a moment (t−1); determine an output value $F^t$ at the moment t according to the membrane potential value $U_m^t$ at the moment t and a transmission threshold $V_{th}$; determine whether to reset a membrane potential according to the output value $F^t$ at the moment t, and determine a reset membrane potential value $R_m^t$ according to a reset voltage value $V_{reset}$; and determine a biological voltage value $V_m^t$ at the moment t according to the reset membrane potential value $R_m^t$; where the output value $F^t$ at the moment t is used as an input into a following layer cascaded with the LIF layer, and the biological voltage value $V_m^t$ at the moment t is used as an input for calculating the membrane potential value at a moment (t+1).

As a further improvement of the present disclosure, the ConvLIF layer is configured to: determine a membrane potential value $U_m^t$ at a moment t according to a value $I^t$, which is obtained by convolution operation or fully connected operation on an input value $X^t$ at the moment t, and a biological voltage value $V_m^{t-1}$ at a moment (t−1); determine an output value $F^t$ at the moment t according to the membrane potential value $U_m^t$ at the moment t and a transmission threshold $V_{th}$; determine whether to reset a membrane potential according to the output value $F^t$ at the moment t, and determine a reset membrane potential value $R_m^t$ according to a reset voltage value $V_{reset}$; and determine a biological voltage value $V_m^t$ at the moment t according to the reset membrane potential value $R_m^t$; where the output value $F^t$ at the moment t is used as an input into a following layer cascaded with the ConvLIF layer, and the biological voltage value $V_m^t$ at the moment t is used as an input for calculating the membrane potential value at a moment (t+1).

As a further improvement of the present disclosure, determining the output value $F^t$ at the moment t according to the membrane potential value $U_m^t$ at the moment t and the transmission threshold $V_{th}$ includes: in a case where the membrane potential value $U_m^t$ at the moment t is greater than or equal to the transmission threshold $V_{th}$, determining that the output value $F^t$ at the moment t is 1; and in a case where the membrane potential value $U_m^t$ at the moment t is less than the transmission threshold $V_{th}$, determining that the output value $F^t$ at the moment t is 0.

As a further improvement of the present disclosure, determining the biological voltage value $V_m^t$ at the moment t according to the reset membrane potential value $R_m^t$ includes: calculating the reset membrane potential value $R_m^t$ by a Leak activation function, and determining the biological voltage value $V_m^t$ at the moment t.

As a further improvement of the present disclosure, when the spatial prediction results of all the video clips are fused and the temporal prediction results of all the video clips are fused by the network fusion module, the prediction results of all the video clips are subjected to one of the following: direct averaging, linear weighting, direct taking of a maximum value, and TOP-K weighting.

As a further improvement of the present disclosure, when the two-stream fusion module performs two-stream fusion on the spatial fusion result and the temporal fusion result, the spatial fusion result and the temporal fusion result are weighted fused.

The present disclosure further provides an electronic device, including a memory configured to store one or more computer instructions, and a processor, where the one or more computer instructions are executed by the processor to implement the behavior recognition method.

The present disclosure further provides a computer-readable storage medium having thereon stored a computer program, which is executed by a processor to implement the behavior recognition method.

BRIEF DESCRIPTION OF DRAWINGS

In order to illustrate the technical solutions in the embodiments of the present disclosure or the prior art more clearly, drawings for the illustration of the embodiments or the prior art will be briefly described below. Apparently, the drawings described below are merely for some embodiments of the present disclosure, and other drawings can be derived by those of ordinary skill in the art from the drawings described herein without any creative work.

DETAIL DESCRIPTION OF EMBODIMENTS

Figure 1:
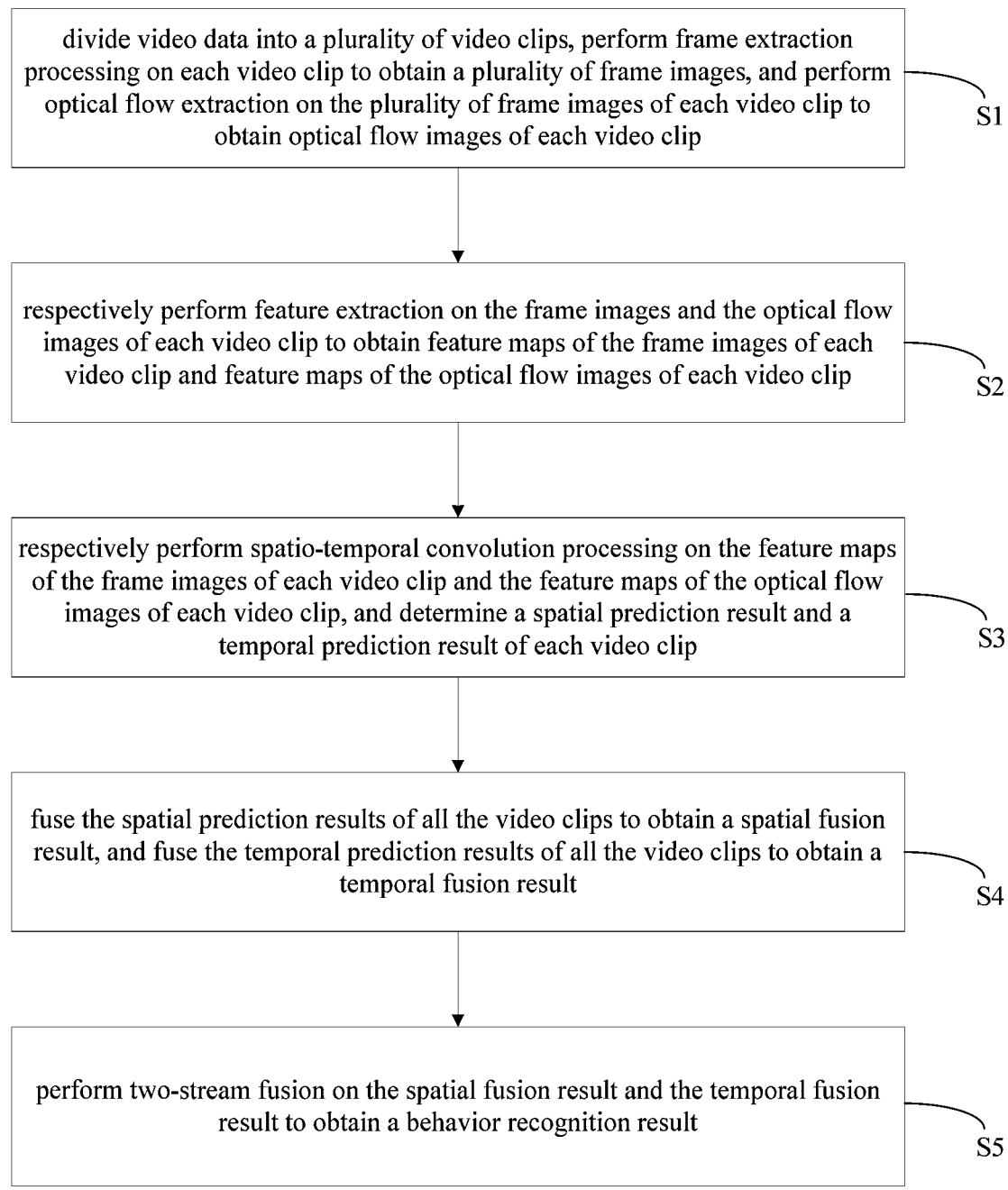
FIG. 1 is a flowchart illustrating a behavior recognition method according to the present disclosure.

The technical solutions in the embodiments of the present disclosure will be clearly and completely described below with reference to the drawings for the embodiments of the present disclosure. Apparently, the embodiments described herein are merely some embodiments of the present disclosure, rather than all embodiments. All other embodiments, which are derived by those of ordinary skill in the art based on the embodiments in the present disclosure without any creative work, fall within the scope of the present disclosure.

It should be noted that, if directional indications (such as "on", "under", "left", "right", "front", "back" . . . ) are mentioned in the embodiments of the present disclosure, the directional indications are only used for explaining a relative positional relationship between components and motions of the components in a specific posture (as shown in the drawings), and if the specific posture is changed, the directional indications are changed accordingly.

In addition, all the terms used in the description of the present disclosure are merely for illustration, and are not intended to limit the scope of the present disclosure. The terms "include" and/or "comprise" are used to specify presence of an element, a step, an operation, and/or a component, but do not exclude presence or addition of one or more other elements, steps, operations, and/or components. The terms "first", "second" and the like may be used to describe various elements, but are not used to indicate an order, and are not intended to limit the elements. In addition, unless otherwise stated, the term "a plurality" in the description of the present disclosure means two or more. Those terms are only used to distinguish one element from another. With referent to the drawings below, these and/or other aspects will become apparent and the illustration of the embodiments of the present disclosure will be more readily understood by those of ordinary skill in the art. The drawings are only intended to illustrate the embodiments of the present disclosure. Based on the following description, those of ordinary skill in the art may readily envisage adopting alternative embodiments of the structures and the methods illustrated herein without departing from the principle described in the present disclosure.

With a behavior recognition method according to the present disclosure, a series of short clips are sparsely sampled from a whole video, all the video clips can produce their respective preliminary predictions about behavior categories, a video-level prediction result is obtained through fusion of the clips, and then a final prediction result is generated through fusion of prediction in all (spatial and temporal) modes. As shown in FIG. 1, the behavior recognition method includes the following operations S1 to S5.

In operation S1, video data is divided into a plurality of video clips, frame extraction processing is performed on each video clip to obtain a plurality of frame images, and optical flow extraction is performed on the plurality of frame images of each video clip obtained after the frame extraction to obtain optical flow images of each video clip.

Figure 2:
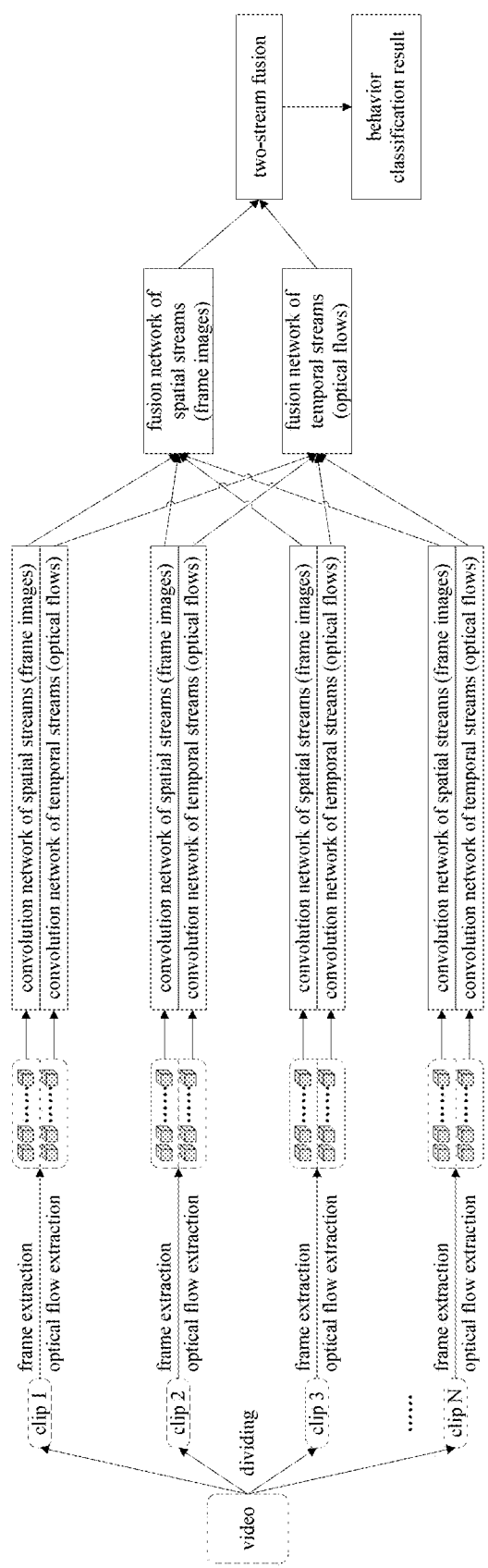
FIG. 2 is a block diagram illustrating a process of a behavior recognition method according to the present disclosure.

As shown in FIG. 2, the video data is equally divided into N video clips. For example, the video data is equally divided into 4 clips.

In an implementation, performing frame extraction processing on each video clip includes: extracting frames from each video clip with a certain interval to obtain $N_1$ (e.g., 40) frame images having a size of [320, 240, 3], with the interval being obtained by dividing the total number of frames of the video clip by $N_1$ (for example, dividing the total number of frames of the video clip by 40, with a remainder rounded off). $N_1$ is an integer greater than 1, and the value of $N_1$ is not limited in the present disclosure.

The optical flow is a method for finding a corresponding relationship between a previous frame and a current frame according to a change of a pixel in an image sequence in a time domain and a correlation between adjacent frames and accordingly calculating motion information of an object between the adjacent frames. In an implementation, performing optical flow extraction on the frame images obtained after frame extraction includes: for the extracted $N_1$ (e.g., 40) frame images, respectively performing optical flow extraction and calculation on every two adjacent frame images to obtain ($N_1$−1) (e.g., 39) optical flows; and copying an optical flow of a second frame and a first frame as a first optical flow, and combining the first optical flow with the ($N_1$−1) (e.g., 39) optical flows to obtain $N_1$ (e.g., 40) optical flows. In an implementation, a Brox algorithm is used for the calculation of the optical flows.

In operation S2, feature extraction is performed respectively on the frame images and the optical flow images of each video clip to obtain feature maps of the frame images of each video clip and feature maps of the optical flow images of each video clip.

In an implementation, an Inception V3 model trained by ImageNet is used to classify the frame images and the optical flow images and extract image features, so as to obtain the feature maps of the frame images of each video clip and the feature maps of the optical flow images of each video clip.

In operation S3, spatio-temporal convolution processing is performed respectively on the feature maps of the frame images of each video clip and the feature maps of the optical flow images of each video clip, and a spatial prediction result (i.e., category probability distribution of spatial streams) and a temporal prediction result (i.e., category probability distribution of temporal streams) of each video clip are determined.

In an implementation, respectively performing the spatio-temporal convolution processing on the feature maps of the frame images of each video clip and the feature maps of the optical flow images of each video clip, and determining the spatial prediction result and the temporal prediction result of each video clip includes: respectively performing time series feature extraction on the feature maps of the frame images of each video clip and the feature maps of the optical flow images of each video clip for n times to obtain a first eigenvector, with n being a positive integer; performing matrix transformation processing on the first eigenvector to obtain a second eigenvector; performing time series full-connection processing on the second eigenvector to obtain a third eigenvector; and determining the spatial prediction result and the temporal prediction result of each video clip according to the third eigenvector.

The time series feature extraction may refer to performing feature extraction processing on the feature maps with considering time series information. The matrix transformation processing refers to a process of expanding several dimensions at the back of one matrix. The time series full-connection processing refers to full-connection processing with considering time series. Thus, a plurality of pictures can be processed at one time with an ensured feature extraction effect; moreover, the plurality of pictures can be associated for processing of the time series information thereamong, thereby improving recognition accuracy.

In the present disclosure, a value of n is not particularly limited.

In an implementation, n=1, respectively performing time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain a first temporal convolution vector; performing pooling processing on the first temporal convolution vector to obtain a first intermediate eigenvector; and determining the first intermediate eigenvector as the first eigenvector.

In an implementation, n=2, and correspondingly, respectively performing time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain the first temporal convolution vector; performing pooling processing on the first temporal convolution vector to obtain the first intermediate eigenvector; performing temporal convolution processing on the first intermediate eigenvector to obtain a second temporal convolution vector; performing pooling processing on the second temporal convolution vector to obtain a second intermediate eigenvector; and determining the second intermediate eigenvector as the first eigenvector.

In an implementation, n>2, and correspondingly, respectively performing time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain the first temporal convolution vector; performing pooling processing on the first temporal convolution vector to obtain the first intermediate eigenvector; performing temporal convolution processing on the first intermediate eigenvector to obtain the second temporal convolution vector; performing pooling processing on an $i^{th}$ temporal convolution vector to obtain an $i^{th}$ intermediate eigenvector; performing temporal convolution processing on the $i^{th}$ intermediate eigenvector to obtain a $(i+1)^{th}$ temporal convolution vector; performing pooling processing on the $(i+1)^{th}$ temporal convolution vector to obtain a $(i+1)^{th}$ intermediate eigenvector, and so on, until an $n^{th}$ intermediate eigenvector is obtained, with i being a positive integer sequentially taken from 2 to (n−1); and determining the $n^{th}$ intermediate eigenvector as the first eigenvector.

The temporal convolution processing may refer to performing convolution processing on the feature maps with considering time series information, for example, a convolution layer with time series information may be used to perform convolution processing on the feature maps. Thus, a plurality of pictures can be associated for processing of the time series information thereamong. Since a temporal convolution vector contains a time dimension, a pooling layer needs to be encapsulated to enable performing pooling processing on the temporal convolution vector.

The operation of respectively performing time series feature extraction on the feature maps of the frame images of each video clip and the feature maps of the optical flow images of each video clip for n times to obtain the first eigenvector is briefly described below by taking a case where n=3 as an example.

Correspondingly, respectively performing time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain a first temporal convolution vector; performing pooling processing on the first temporal convolution vector to obtain a first intermediate eigenvector; performing temporal convolution processing on the first intermediate eigenvector to obtain a second temporal convolution vector; performing pooling processing on the second temporal convolution vector to obtain a second intermediate eigenvector; performing temporal convolution processing on the second intermediate eigenvector to obtain a third temporal convolution vector; performing pooling processing on the third temporal convolution vector to obtain a third intermediate eigenvector; and determining the third intermediate eigenvector as the first eigenvector.

In an implementation, respectively performing spatiotemporal convolution processing on the feature maps of the frame images of each video clip and the feature maps of the optical flow images of each video clip is implemented by a neural network, and the method further includes: training the neural network according to a training set.

For example, a UCF101 data set may be adopted in the present disclosure, and the UCF101 data set contains 13320 videos from 101 action categories, and gives the largest diversity in terms of actions and with the presence of large variations in camera motion, object appearance and pose, object scale, viewpoint, cluttered background, illumination conditions, etc. The videos in the 101 action categories are grouped into 25 groups, each of which may consist of 4 to 7 videos of action. The videos from the same group may share some common features, such as similar background, similar viewpoint, etc. The action categories may be divided into five types: 1) human-to-object interaction; 2) body-motion only; 3) human-human interaction; 4) playing musical instruments; and 5) sports.

Performing frame extraction processing on the video data in the UCF101 data set includes: decomposing each video clip into frame images and storing the number of frames in a csv file; selecting a plurality of samples, the number of frames of which is greater than $N_1$ (e.g., 40) and less than $N_2$ (e.g., 900) from the frame images obtained after the decomposition; equally dividing the number of frames of the selected samples into 4 parts; and extracting frames from each part of the samples with a certain interval to obtain $N_1$ (e.g., 40) frames of images having a size of [320, 240, 3], with the interval being obtained by dividing the total number of frames of the video clip by $N_1$ (for example, dividing the total number of frames of the video clip by 40, with a remainder rounded off). The sampled clip obtained in such method only contains a small part of frames, so that such method significantly reduces computational overhead compared to a method using densely sampled frames. Similarly, after performing frame extraction, performing optical flow extraction on the video data in the UCF101 data set with the above method, so as to obtain a data set required by the neural network. The data set is divided into a training set Train and a test set Test according to ucfTrainTestlist. The neural network is trained through the training set, and the trained neural network is used as a prediction model for obtaining the temporal prediction result and the spatial prediction result of the video clip. For example, the feature maps of the frame images and the feature maps of the optical flow images are input into the trained neural network to be processed, and the trained neural network outputs the spatial prediction result (i.e., the category probability distribution of the spatial streams) and the temporal prediction result (i.e., the category probability distribution of the temporal streams) of each video clip.

Figure 3:
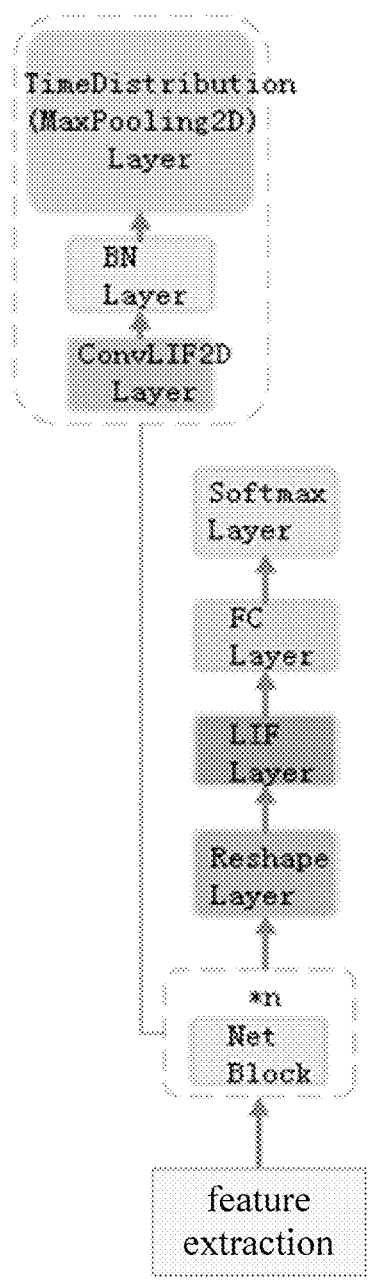
FIG. 3 is a block diagram of a neural network according to the present disclosure.

In an implementation, as shown in FIG. 3, the neural network includes: n Blocks (the Net Block in FIG. 3), a Reshape layer (the Reshape Layer in FIG. 3), an LIF layer (the LIF Layer in FIG. 3), a fully connected layer (the FC Layer in FIG. 3), and a Softmax layer (the Softmax Layer in FIG. 3). Each Block includes a ConvLIF layer (the ConvLIF2D Layer in FIG. 3) and a pooling Layer (the TimeDistribution (MaxPooling2D) Layer in FIG. 3), which are cascaded. n is a positive integer and satisfies n≥1, and the n Blocks are cascaded when n>1.

In an implementation, respectively performing spatio-temporal convolution processing on the feature maps of the frame images of each video clip and the feature maps of the optical flow images of each video clip with the neural network includes: performing, by the n Blocks, time series feature extraction on the feature maps of the frame images of each video clip and the feature maps of the optical flow images of each video clip for n times to obtain a first eigenvector; performing, by the Reshape layer, matrix transformation processing on the first eigenvector to obtain a second eigenvector; performing, by the LIF layer and the fully connected layer, time series full-connection processing on the second eigenvector to obtain a third eigenvector; and determining, by the Softmax layer, the spatial prediction result and the temporal prediction result of each video clip according to the third eigenvector.

A specific value of n is not particularly limited in the present disclosure. For example, in an implementation, n=1, and performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain a first temporal convolution vector; performing, by the pooling layer, pooling processing on the first temporal convolution vector to obtain a first intermediate eigenvector; and determining the first intermediate eigenvector as the first eigenvector.

In another implementation, n=2, and correspondingly, performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain the first temporal convolution vector; performing, by the pooling layer, pooling processing on the first temporal convolution vector to obtain the first intermediate eigenvector; performing, by the ConvLIF layer, temporal convolution processing on the first intermediate eigenvector to obtain a second temporal convolution vector; performing, by the pooling layer, pooling processing on the second temporal convolution vector to obtain a second intermediate eigenvector; and determining the second intermediate eigenvector as the first eigenvector.

In another implementation, when n>2, performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain the first temporal convolution vector; performing, by the pooling layer, pooling processing on the first temporal convolution vector to obtain the first intermediate eigenvector; performing, by the ConvLIF layer, temporal convolution processing on the first intermediate eigenvector to obtain the second temporal convolution vector; performing, by the pooling layer, pooling processing on an $i^{th}$ temporal convolution vector to obtain an $i^{th}$ intermediate eigenvector; performing, by the ConvLIF layer, temporal convolution processing on the $i^{th}$ intermediate eigenvector to obtain a $(i+1)^{th}$ temporal convolution vector; performing, by the pooling layer, pooling processing on the $(i+1)^{th}$ temporal convolution vector to obtain a $(i+1)^{th}$ intermediate eigenvector, and so on, until an $n^{th}$ intermediate eigenvector is obtained, with i being a positive integer sequentially taken from 2 to (n−1); and determining the $n^{th}$ intermediate eigenvector as the first eigenvector.

For example, three Blocks are provided. In such case, when time series feature extraction is performed for three times, a ConvLIF layer of a first Block may respectively perform temporal convolution processing on the feature maps of the frame images of each video clip and the feature maps of the optical flow images of each video clip to obtain a first temporal convolution vector, and a pooling layer of the first Block may perform pooling processing on the first temporal convolution vector to obtain a first intermediate eigenvector. A ConvLIF layer of a second Block may perform temporal convolution processing on the first intermediate eigenvector to obtain a second temporal convolution vector, a pooling layer of the second Block may perform pooling processing on the second temporal convolution vector to obtain a second intermediate eigenvector, a ConvLIF layer of a third Block may perform temporal convolution processing on the second intermediate eigenvector to obtain a third temporal convolution vector, and a pooling layer of the third Block may perform pooling processing on the third temporal convolution vector to obtain a third intermediate eigenvector which is determined as the first eigenvector. The number of the Blocks is not limited in the present disclosure.

In an implementation, each Block further includes: a Batch Normalization (BN) layer cascaded between the ConvLIF layer and the pooling layer, and the BN layer is configured to perform normalizing processing on the temporal convolution vectors and then pooling processing may be performed on the normalized temporal convolution vectors.

Specifically, when n=1 or n=2, performing, by the pooling layer, pooling processing on the first temporal convolution vector to obtain the first intermediate eigenvector includes: performing, by the BN layer, normalizing processing on the first temporal convolution vector; and performing, by the pooling layer, pooling processing on the normalized first temporal convolution vector.

When n=2, performing, by the pooling layer, pooling processing on the second temporal convolution vector to obtain the second intermediate eigenvector includes: performing, by the BN layer, normalizing processing on the second temporal convolution vector; and performing, by the pooling layer, pooling processing on the normalized second temporal convolution vector.

When n>2, performing, by the pooling layer, pooling processing on the first temporal convolution vector to obtain the first intermediate eigenvector includes: performing, by the BN layer, normalizing processing on the first temporal convolution vector; and performing, by the pooling layer, pooling processing on the normalized first temporal convolution vector to obtain the first intermediate eigenvector.

When n>2, performing, by the pooling layer, pooling processing on the $i^{th}$ temporal convolution vector to obtain the $i^{th}$ intermediate eigenvector includes: performing, by the BN layer, normalizing processing on the $i^{th}$ temporal convolution vector; and performing, by the pooling layer, pooling processing on the normalized $i^{th}$ temporal convolution vector to obtain the $i^{th}$ intermediate eigenvector.

Since dimensions of output data from the Blocks are not suitable for being used as an input into the LIF layer, the Reshape layer is added to process the output data from the Blocks to expand the dimensions of the data, so that the processed data can be used as the input into the LIF layer. For example, an output shape of the Block is (10, 2, 2, 1024), and the Reshape layer is added to process the output data to directly expand the three dimensions at the back of the output shape, so as to obtain data having a shape of (10, 4096). The BN layer, which is cascaded between the ConvLIF layer and the pooling layer, performs batch normalization on data, thus a network convergence speed can be accelerated, and training stability can be improved.

In an implementation, the fully connected layer is an FC fully connected layer, and the pooling layer is a MaxPooling pooling layer.

Figure 4:
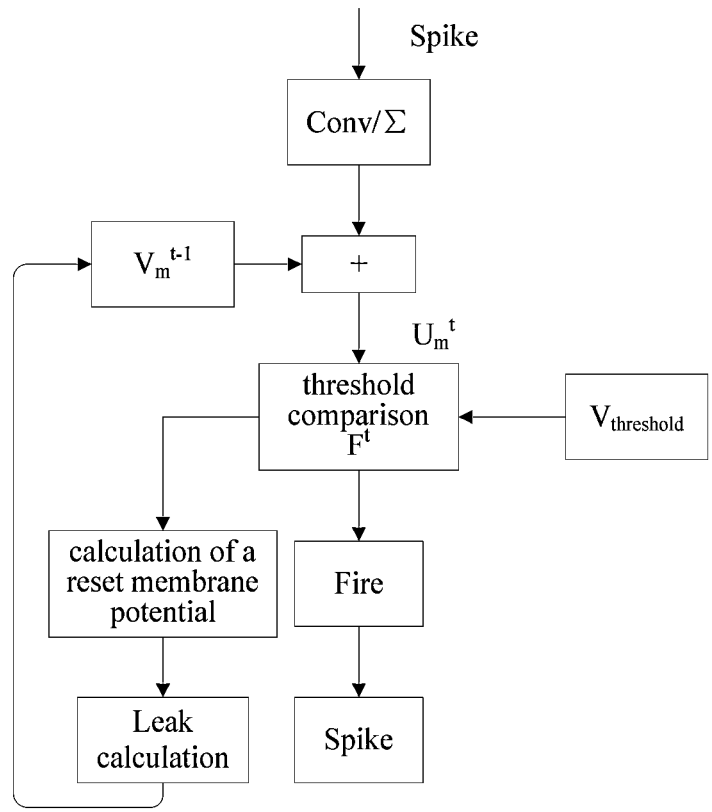
FIG. 4 is a schematic diagram illustrating an operational process of a ConvLIF layer and an operational process of an LIF layer in a neural network according to the disclosure.

In an implementation, as shown in FIG. 4, the LIF layer is configured to: determine a membrane potential value $U_m^t$ at a moment t according to a value $I^t$, which is obtained by fully connected operation on an input value $X^t$ at the moment t, and a biological voltage value $V_m^{t-1}$ at a moment (t−1), where $I^t = X^t * W$, W is a weight of the input value $X^t$, and $U_m^t = I^t + V_m^{t-1}$; determine an output value $F^t$ at the moment t according to the membrane potential value $U_m^t$ at the moment t and a transmission threshold $V_{th}$; determine whether to reset a membrane potential according to the output value $F^t$ at the moment t, and determine a reset membrane potential value $R_m^t$ according to a reset voltage value $V_{reset}$, where $R_m^t = F^t \cdot V_{reset} + (1 - F^t) \cdot U_m^t$; and determine a biological voltage value $V_m^t$ at the moment t according to the reset membrane potential value $R_m^t$; where the output value $F^t$ at the moment t is used as an input into a following layer cascaded with the LIF layer, and the biological voltage value $V_m^t$ at the moment t is used as an input of a membrane potential value at a moment (t+1), and the input value $X^t$ is a discrete value.

In an implementation, as shown in FIG. 3, the ConvLIF layer is configured to: determine the membrane potential value $U_m^t$ at the moment t according to the value $I^t$, which is obtained by convolution operation or fully connected operation on the input value $X^t$ at the moment t, and the biological voltage value $V_m^{t-1}$ at the moment (t−1), where $I^t = Conv(X^t, W,)$, W is the weight of the input value $X^t$, and $U_m^t = V_m^{t-1}$; determine the output value $F^t$ at the moment t according to the membrane potential value $U_m^t$ at the moment t and the transmission threshold $V_{th}$; determine whether to reset the membrane potential according to the output value $F^t$ at the moment t, and determine the reset membrane potential value $R_m^t$ according to the reset voltage value $V_{reset}$, where $R_m^t = F^t \cdot V_{reset} + (1 - F^t) \cdot U_m^t$; and determine the biological voltage value $V_m^t$ at the moment t according to the reset membrane potential value $R_m^t$; where the output value $F^t$ at the moment t is used as an input into a following layer cascaded with the ConvLIF layer, and the biological voltage value $V_{th}$ at the moment t is used as an input of the membrane potential value at the moment (t+1), and the input value $X^t$ is a discrete value.

In an implementation, determining the output value $F^t$ at the moment t according to the membrane potential value $U_m^t$ at the moment t and the transmission threshold $V_{th}$ includes: in a case where the membrane potential value $U_m^t$ at the moment t is greater than or equal to the transmission threshold $V_{th}$, determining that the output value $F^t$ at the moment t is 1; and in a case where the membrane potential value $U_m^t$ at the moment t is less than the transmission threshold $V_{th}$, determining that the output value $F^t$ at the moment t is 0.

In an implementation, determining the biological voltage value $V_m^t$ at the moment t according to the reset membrane potential value $R_m^t$ includes: calculating the reset membrane potential value $R_m^t$ by a Leak activation function, and determining the biological voltage value $V_m^t$ at the moment t, with $V_m^t = \alpha \cdot R_m^t + \beta$, where α is a leakage mechanism, and β is a bias having a theoretical value between 0 and 1.

In an implementation, since the ConvLIF layer has an extra time dimension compared with the pooling layer, the pooling layer needs to be encapsulated when the ConvLIF is connected to the pooling layer, so that the pooling layer can process an output result of the ConvLIF layer. For example, a TimeDistribution layer is used to encapsulate a MaxPooling2D pooling layer, so that the MaxPooling2D pooling layer can process the output result of the ConvLIF layer.

The neural network described in the present disclosure adopts a network with a convergence of ANN and Spiking Neural Network (SNN), that is, the ConvLIF layer and the LIF layer are converged with the normalization layer and the pooling layer. The LIF layer is a fully connected layer having a time series, can process information having a time series, and is similar to a Long Short-Term Memory (LSTM) in the ANN in function, but a weight of the LIF layer is significantly less than that of the LSTM (a calculation amount of the LIF layer in the convolution network in the present disclosure is only one fourth of that of the LSTM and only one third of that of a Gated Recurrent Unit (GRU)), so that the calculation amount is greatly reduced and requirements on a computing device are reduced, thereby correspondingly reducing a size of the network and a storage space. The ConvLIF layer is a convolution layer having time series information, and can process convolution having a time series. Only one picture can be processed by convolution in the ANN without being associated with a previous picture and a following picture, while the ConvLIF layer can process a plurality of pictures at one time, that is, the ConvLIF layer can produce a convolution effect of the ANN, and can also associate the plurality of pictures to process the time series information thereamong. In addition, a weight of the ConvLIF layer is also significantly less than that of a Conv3D layer (a weight and a calculation amount of a ConvLIF2D layer of the convolution network in the present disclosure are only half of those of the Conv3D layer), so that the calculation amount is further reduced and the requirements on a computing device are reduced, thereby correspondingly reducing the size of the network and the storage space.

In operation S4, the spatial prediction results of all the video clips are fused to obtain a spatial fusion result, and the temporal prediction results of all the video clips are fused to obtain a temporal fusion result.

In an implementation, when the spatial prediction results of all the video clips are fused and the temporal prediction results of all the video clips are fused, the spatial prediction results of all the video clips are subjected to one of direct averaging, linear weighting, direct taking of a maximum value, and TOP-K weighting, and the temporal prediction results of all the video clips are subjected to one of direct averaging, linear weighting, direct taking of a maximum value, and TOP-K weighting. In an implementation, the fusion method of direct averaging is adopted for both the spatial prediction results and the temporal prediction results, and such fusion method can achieve joint modeling of a plurality of video clips, capture visual information from the whole video and improve a recognition effect. The behavior recognition method of the present disclosure does not limit the fusion method of the spatial prediction results and that of the temporal prediction results.

In operation S5, two-stream fusion is performed on the spatial fusion result and the temporal fusion result to obtain a behavior recognition result.

In an implementation, the spatial fusion result and the temporal fusion result are weighted fused for two-stream fusion, for example, a weight of a fusion result of spatial streams is set to 0.6, and a weight of a fusion result of temporal streams is set to 0.4. The behavior recognition method of the present disclosure does not limit the two-stream fusion method.

Figure 5:
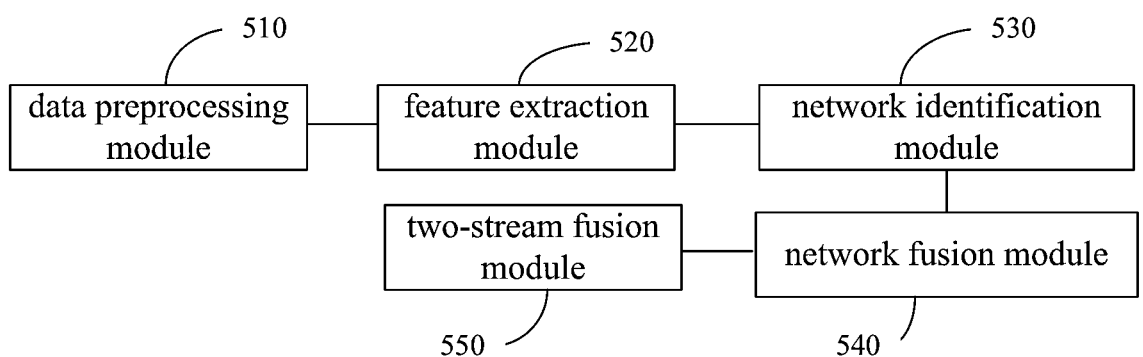
FIG. 5 is a block diagram of a behavior recognition system according to the present disclosure.

A behavior recognition system according to the implementations of the present disclosure adopts the above behavior recognition method, as shown in FIG. 5, the behavior recognition system includes a data preprocessing module 510, a feature extraction module 520, a network identification module 530, a network fusion module 540, and a two-stream fusion module 550.

The data preprocessing module 510 is configured to divide video data into a plurality of video clips, perform frame extraction processing on each video clip to obtain a plurality of frame images, and perform optical flow extraction on the plurality of frame images of each video clip to obtain a plurality of optical flow images of each video clip.

In an implementation, the data preprocessing module 510 equally divides the video data into N video clips. For example, the data preprocessing module 510 equally divides the video data into 4 video clips.

In an implementation, performing, by the data preprocessing module 510, frame extraction processing on each video clip includes: extracting frames from each video clip with a certain interval to obtain $N_1$ (e.g., 40) frame images having a size of [320, 240, 3], with the interval being obtained by dividing the total number of frames of the video clip by $N_1$ (for example, dividing the total number of frames of the video clip by 40, with a remainder rounded off). The sampled clip obtained in such method only contains a small part of frames, so that such method significantly reduces computational overhead compared to a method using densely sampled frames. A value of $N_1$ is not limited in the present disclosure.

In an implementation, performing, by the data preprocessing module 510, optical flow extraction on the plurality of frame images of each video clip includes: for the extracted $N_1$ (e.g., 40) frames of images, respectively performing optical flow extraction and calculation on a latter frame and a former frame to obtain ($N_1$−1) (e.g., 39) optical flows; and copying an optical flow of a second frame and a first frame as a first optical flow, and combining the first optical flow with the ($N_1$−1) (e.g., 39) optical flows to obtain $N_1$ (e.g., 40) optical flows. In an implementation, a Brox algorithm is used for the calculation of the optical flows.

The feature extraction module 520 is configured to respectively perform feature extraction on the frame images and the optical flow images of each video clip to obtain feature maps of the frame images of each video clip and feature maps of the optical flow images of each video clip.

In an implementation, the feature extraction module 520 classifies the frame images and the optical flow images and extracts image features by using an Inception V3 model trained by ImageNet, so as to obtain the feature maps of the frame images of each video clip and the feature maps of the optical flow images of each video clip.

The network identification module 530 is configured to respectively perform spatio-temporal convolution processing on the feature maps of the frame images of each video clip and the feature maps of the optical flow images of each video clip, and determine a spatial prediction result (i.e., category probability distribution of spatial streams) and a temporal prediction result (i.e., category probability distribution of temporal streams) of each video clip.

In an implementation, respectively performing, by the network identification module 530, spatio-temporal convolution processing on the feature maps of the frame images of each video clip and the feature maps of the optical flow images of each video clip, and determining the spatial prediction result and the temporal prediction result of each video clip includes: respectively performing time series feature extraction on the feature maps of the frame images of each video clip and the feature maps of the optical flow images of each video clip for n times to obtain a first eigenvector, with n being a positive integer; performing matrix transformation processing on the first eigenvector to obtain a second eigenvector; performing time series full-connection processing on the second eigenvector to obtain a third eigenvector; and determining the spatial prediction result and the temporal prediction result of each video clip according to the third eigenvector.

The time series feature extraction may refer to performing feature extraction processing on the feature maps with considering time series information. The matrix transformation processing refers to a process of expanding several dimensions at the back of one matrix. The time series full-connection processing refers to full-connection processing with considering time series. Thus, a plurality of pictures can be processed at one time with an ensured feature extraction effect; moreover, the plurality of pictures can be associated for processing of the time series information thereamong, thereby improving the recognition accuracy.

In an implementation, when n=1, respectively performing, by the network identification module 530, time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain a first temporal convolution vector; performing pooling processing on the first temporal convolution vector to obtain a first intermediate eigenvector; and determining the first intermediate eigenvector as the first eigenvector.

When n=2, respectively performing, by the network identification module 530, time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain the first temporal convolution vector; performing pooling processing on the first temporal convolution vector to obtain the first intermediate eigenvector; performing temporal convolution processing on the first intermediate eigenvector to obtain a second temporal convolution vector; performing pooling processing on the second temporal convolution vector to obtain a second intermediate eigenvector; and determining the second intermediate eigenvector as the first eigenvector.

When n>2, respectively performing, by the network identification module 530, time series feature extraction on the feature maps of the frame images of each video clip and the feature maps of the optical flow images of each video clip for n times to obtain the first eigenvector includes: respectively performing temporal convolution processing on the feature maps of the frame images of each video clip and the feature maps of the optical flow images of each video clip to obtain the first temporal convolution vector; performing pooling processing on the first temporal convolution vector to obtain the first intermediate eigenvector; performing temporal convolution processing on the first intermediate eigenvector to obtain the second temporal convolution vector; performing pooling processing on an $i^{th}$ temporal convolution vector to obtain an $i^{th}$ intermediate eigenvector; performing temporal convolution processing on the $i^{th}$ intermediate eigenvector to obtain a $(i+1)^{th}$ temporal convolution vector; performing pooling processing on the $(i+1)^{th}$ temporal convolution vector to obtain a $(i+1)^{th}$ intermediate eigenvector, and so on, until an $n^{th}$ intermediate eigenvector is obtained, with i being a positive integer sequentially taken from 2 to (n−1); and determining the $n^{th}$ intermediate eigenvector as the first eigenvector.

The temporal convolution processing may refer to performing convolution processing on the feature maps with considering time series information, for example, a convolution layer with time series information may be used to perform convolution processing on the feature maps. Thus, a plurality of pictures can be associated for processing of the time series information thereamong. Since a temporal convolution vector contains a time dimension, a pooling layer needs to be encapsulated to enable performing pooling processing on the temporal convolution vector.

Performing, by the data preprocessing module MO, frame extraction processing on each video clip includes: extracting frames from each video clip with a certain interval to obtain $N_1$ frames of images, with the interval being obtained by dividing the total number of frames of the video clip by $N_1$, and $N_1$ being an integer greater than 1.

Performing, by the data preprocessing module MO, optical flow extraction on the plurality of frame images of each video clip includes: for the extracted $N_1$ frames of images, respectively performing optical flow extraction and calculation on every two adjacent frame images to obtain $(N_1-1)$ optical flows; and copying an optical flow of a second frame and a first frame as a first optical flow, and combining the first optical flow with the $(N_1-1)$ optical flows to obtain $N_1$ optical flows.

In an implementation, respectively performing, by the network identification module 530, spatio-temporal convolution processing on the feature maps of the frame images of each video clip and the feature maps of the optical flow images of each video clip is implemented by a neural network, and the system further includes the neural network trained according to a training set.

For example, a UCF101 data set may be adopted in the present disclosure, and the UCF101 data set contains 13320 videos from 101 action categories, and gives the largest diversity in terms of actions and with the presence of large variations in camera motion, object appearance and pose, object scale, viewpoint, cluttered background, illumination conditions, etc. The videos in the 101 action categories are grouped into 25 groups, each of which may consist of 4 to 7 videos of action. The videos from the same group may share some common features, such as similar background, similar viewpoint, etc. The action categories may be divided into five types: 1) human-to-object interaction; 2) body-motion only; 3) human-human interaction; 4) playing musical instruments; and 5) sports.

Performing frame extraction processing on the video data in the UCF101 data set includes: decomposing each video clip into frame images and storing the number of frames in a csv file; selecting a plurality of samples, the number of frames of which is greater than $N_1$ (e.g., 40) and less than N2 (e.g., 900) from the frame images obtained after the decomposition; equally dividing the number of frames of the selected samples into 4 parts; and extracting frames from each part of the samples with a certain interval to obtain $N_1$ (e.g., 40) frames of images having a size of [320, 240, 3], with the interval being obtained by dividing the total number of frames of the video clip by $N_1$ (for example, dividing the total number of frames of the video clip by 40, with a remainder rounded off). The sampled clip obtained in such method only contains a small part of frames, so that such method significantly reduces computational overhead compared to a method using densely sampled frames. Similarly, after performing frame extraction, performing optical flow extraction on the video data in the UCF101 data set with the above method, so as to obtain a data set required by the neural network. The data set is divided into a training set Train and a test set Test according to ucfTrainTestlist. The neural network is trained through the training set, and the trained neural network is used as a prediction model for obtaining the temporal prediction result and the spatial prediction result of the video clip. For example, the feature maps of the frame images and the feature maps of the optical flow images are input into the trained neural network to be processed, and the trained neural network outputs the spatial prediction result (i.e., the category probability distribution of the spatial streams) and the temporal prediction result (i.e., the category probability distribution of the temporal streams) of each video clip.

In an implementation, as shown in FIG. 3, the neural network includes: n Blocks, a Reshape layer, an LIF layer, a fully connected layer and a Softmax layer; and each Block includes: a ConvLIF layer and a pooling layer, which are cascaded. n is a positive integer and satisfies n≥1, and the n Blocks are cascaded when n>1.

In an implementation, respectively performing spatio-temporal convolution processing on the feature maps of the frame images of each video clip and the feature maps of the optical flow images of each video clip with the neural network includes: performing, by the n Blocks, time series feature extraction on the feature maps of the frame images of each video clip and the feature maps of the optical flow images of each video clip for n times to obtain a first eigenvector; performing, by the Reshape layer, matrix transformation processing on the first eigenvector to obtain a second eigenvector; performing, by the LIF layer and the fully connected layer, time series full-connection processing on the second eigenvector to obtain a third eigenvector; and determining, by the Softmax layer, the spatial prediction result and the temporal prediction result of each video clip according to the third eigenvector.

In an implementation, when n=1, performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain a first temporal convolution vector; performing, by the pooling layer, pooling processing on the first temporal convolution vector to obtain a first intermediate eigenvector; and determining the first intermediate eigenvector as the first eigenvector.

When n=2, performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain the first temporal convolution vector; performing, by the pooling layer, pooling processing on the first temporal convolution vector to obtain the first intermediate eigenvector; performing, by the ConvLIF layer, temporal convolution processing on the first intermediate eigenvector to obtain a second temporal convolution vector; performing, by the pooling layer, pooling processing on the second temporal convolution vector to obtain a second intermediate eigenvector; and determining the second intermediate eigenvector as the first eigenvector.

When n>2, performing, by the n Blocks, time series feature extraction on the feature maps of the frame images of each video clip and the feature maps of the optical flow images of each video clip for n times to obtain the first eigenvector includes: respectively performing, by the ConvLIF layer, temporal convolution processing on the feature maps of the frame images of each video clip and the feature maps of the optical flow images of each video clip to obtain the first temporal convolution vector; performing, by the pooling layer, pooling processing on the first temporal convolution vector to obtain the first intermediate eigenvector; performing, by the ConvLIF layer, temporal convolution processing on the first intermediate eigenvector to obtain the second temporal convolution vector; performing, by the pooling layer, pooling processing on an $i^{th}$ temporal convolution vector to obtain an $i^{th}$ intermediate eigenvector; performing, by the ConvLIF layer, temporal convolution processing on the $i^{th}$ intermediate eigenvector to obtain a $(i+1)^{th}$ temporal convolution vector; performing, by the pooling layer, pooling processing on the $(i+1)^{th}$ temporal convolution vector to obtain a $(i+1)^{th}$ intermediate eigenvector, and so on, until an $n^{th}$ intermediate eigenvector is obtained, with i being a positive integer sequentially taken from 2 to (n−1); and determining the $n^{th}$ intermediate eigenvector as the first eigenvector.

For example, two Blocks are provided. In such case, when time series feature extraction is performed twice, a ConvLIF layer of a first Block may respectively perform temporal convolution processing on the feature maps of the frame images of each video clip and the feature maps of the optical flow images of each video clip to obtain a first temporal convolution vector, and a pooling layer of the first Block may perform pooling processing on the first temporal convolution vector to obtain a first intermediate eigenvector. A ConvLIF layer of a second Block may perform temporal convolution processing on the first intermediate eigenvector to obtain a second temporal convolution vector, and a pooling layer of the second Block may perform pooling processing on the second temporal convolution vector to obtain a second intermediate eigenvector which is determined as the first eigenvector.

In an implementation, each Block further includes a BN layer cascaded between the ConvLIF layer and the pooling layer, and the BN layer is configured to perform normalizing processing on the temporal convolution vectors and then pooling processing may be performed on the normalized temporal convolution vectors.

Specifically, when n=1 or n=2, performing, by the pooling layer, pooling processing on the first temporal convolution vector to obtain the first intermediate eigenvector includes: performing, by the BN layer, normalizing processing on the first temporal convolution vector; and performing, by the pooling layer, pooling processing on the normalized first temporal convolution vector.

When n=2, performing, by the pooling layer, pooling processing on the second temporal convolution vector to obtain the second intermediate eigenvector includes: performing, by the BN layer, normalizing processing on the second temporal convolution vector; and performing, by the pooling layer, pooling processing on the normalized second temporal convolution vector.

When n>2, performing, by the pooling layer, pooling processing on the first temporal convolution vector to obtain the first intermediate eigenvector includes: performing, by the BN layer, normalizing processing on the first temporal convolution vector; and performing, by the pooling layer, pooling processing on the normalized first temporal convolution vector to obtain the first intermediate eigenvector.

When n>2, performing, by the pooling layer, pooling processing on the $i^{th}$ temporal convolution vector to obtain the $i^{th}$ intermediate eigenvector includes: performing, by the BN layer, normalizing processing on the $i^{th}$ temporal convolution vector; and performing, by the pooling layer, pooling processing on the normalized $i^{th}$ temporal convolution vector to obtain the $i^{th}$ intermediate eigenvector.

Since dimensions of output data from the Blocks are not suitable for being used as an input into the LIF layer, the Reshape layer is added to process the output data from the Blocks to expand the dimensions of the data, so that the processed data can be used as the input into the LIF layer. For example, an output shape of the Block is (10, 2, 2, 1024), and the Reshape layer is added to process the output data to directly expand the three dimensions at the back of the output shape, so as to obtain data having a shape of (10, 4096). The BN layer, which is cascaded between the ConvLIF layer and the pooling layer, performs batch normalization on data, thus a network convergence speed can be accelerated, and training stability can be improved.

In an implementation, the fully connected layer is an FC fully connected layer, and the pooling layer is a MaxPooling pooling layer.

In an implementation, as shown in FIG. 4, the LIF layer is configured to: determine a membrane potential value $U_m^t$ at a moment t according to a value $I^t$, which is obtained by fully connected operation of an input value $X^t$ at the moment t, and a biological voltage value $V_m^{t-1}$ at a moment (t−1), where $I^t=X^t*W$, W is the weight of the input value $X^t$, and $U_m^t=I^t+V_m^{t-1}$; determine an output value $F^t$ at the moment t according to the membrane potential value $U_m^t$ at the moment t and a transmission threshold $V_{th}$; determine whether to reset a membrane potential according to the output value $F^t$ at the moment t, and determine a reset membrane potential value $R_m^t$ according to a reset voltage value $V_{reset}$, where $R_m^t=F^t \cdot V_{reset}+(1-F^t) \cdot U_m^t$; and determine a biological voltage value $V_m^t$ at the moment t according to the reset membrane potential value $R_m^t$; where the output value $F^t$ at the moment t is used as an input into a following layer cascaded with the LIF layer, and the biological voltage value $V_m^t$ at the moment t is used as an input of a membrane potential value at a moment (t+1), and the input value $X^t$ is a discrete value.

In an implementation, as shown in FIG. 3, the ConvLIF layer is configured to: determine the membrane potential value $U_m^t$ at the moment t according to the value $I^t$, which is obtained by convolution operation or fully connected operation on the input value $X^t$ at the moment t, and the biological voltage value $V_m^{t-1}$ at the moment (t−1), where $I^t=\text{Conv}(X^t,W,)$, W is the weight of the input value $X^t$, and $U_m^t=I^t+V_m^{t-1}$; determine the output value $F^t$ at the moment t according to the membrane potential value $U_m^t$ at the moment t and the transmission threshold $V_{th}$; determine whether to reset the membrane potential according to the output value $F^t$ at the moment t, and determine the reset membrane potential value $R_m^t$ according to the reset voltage value $V_{reset}$, where $R_m^t=F^t \cdot V_{reset}+(1-F^t) \cdot U_m^t$; and determine the biological voltage value $V_m^t$ at the moment t according to the reset membrane potential value $R_m^t$; where the output value $F^t$ at the moment t is used as an input into a following layer cascaded with the ConvLIF layer, and the biological voltage value $V_m^t$ at the moment t is used as an input of the membrane potential value at the moment (t+1), and the input value $X^t$ is a discrete value.

In an implementation, determining the output value $F^t$ at the moment t according to the membrane potential value $U_m^t$ at the moment t and the transmission threshold $V_{th}$ includes: in a case where the membrane potential value $U_m^t$ at the moment t is greater than or equal to the transmission threshold $V_{th}$, determining that the output value $F^t$ at the moment t is 1; and in a case where the membrane potential value $U_m^t$ at the moment t is less than the transmission threshold $V_{th}$, determining that the output value $F^t$ at the moment t is 0.

In an implementation, determining the biological voltage value $V_m^t$ at the moment t according to the reset membrane potential value $R_m^t$ includes: calculating the reset membrane potential value $R_m^t$ by a Leak activation function, and determining the biological voltage value $V_m^t$ at the moment t, with $V_m^t=\alpha \cdot R_m^t+\beta$, where $\alpha$ is a leakage mechanism, and $\beta$ is a bias having a theoretical value between 0 and 1.

In an implementation, since the ConvLIF layer has an extra time dimension compared with the pooling layer, the pooling layer needs to be encapsulated when the ConvLIF is connected to the pooling layer, so that the pooling layer can process an output result of the ConvLIF layer. For example, a TimeDistribution layer is used to encapsulate a MaxPooling2D pooling layer, so that the MaxPooling2D pooling layer can process the output result of the ConvLIF layer.

The network fusion module 540 is configured to fuse the spatial prediction results of all the video clips to obtain a spatial fusion result, and fuse the temporal prediction results of all the video clips to obtain a temporal fusion result.

In an implementation, when the spatial prediction results of all the video clips are fused and the temporal prediction results of all the video clips are fused, the spatial prediction results of all the video clips are subjected to one of direct averaging, linear weighting, direct taking of a maximum value, and TOP-K weighting, and the temporal prediction results of all the video clips are subjected to one of direct averaging, linear weighting, direct taking of a maximum value, and TOP-K weighting. In an implementation, the fusion method of direct averaging is adopted for both the spatial prediction results and the temporal prediction results, and such fusion method can achieve joint modeling of a plurality of video clips, capture visual information from the whole video and improve a recognition effect. The behavior recognition system of the present disclosure does not limit the fusion method of the spatial prediction results and that of the temporal prediction results.

The two-stream fusion module 550 is configured to perform two-stream fusion on the spatial fusion result and the temporal fusion result to obtain a behavior recognition result.

In an implementation, the spatial fusion result and the temporal fusion result are weighted fused for two-stream fusion, for example, a weight of a fusion result of spatial streams is set to 0.6, and a weight of a fusion result of temporal streams is set to 0.4. The behavior recognition system of the present disclosure does not limit the two-stream fusion method.

The present disclosure further relates to an electronic device including a server, a terminal, etc. The electronic device includes: at least one processor; a memory which communicates with and is connected to the at least one processor; and a communication component which communicates with and is connected to a storage medium and is configured to receive and transmit data under the control of the processor. The memory has stored instructions executable by the at least one processor, and the instructions are executed by the at least one processor to implement the behavior recognition method described in the above embodiments.

In an implementation, as a non-volatile computer-readable storage medium, the memory may be configured to store non-volatile software programs, non-volatile computer-executable programs and modules. The processor executes various functional applications of a device and performs data processing by running the non-volatile software programs, instructions and the modules stored in the memory, that is, implementing the above behavior recognition method.

The memory may include a program storage region and a data storage region, and the program storage region may store an operating system, and an application program required by at least one function; and the data storage region may store a list of options, etc. Further, the memory may include a high-speed random access memory, and may also include a non-volatile memory, such as at least one magnetic disk, a flash memory, or other non-volatile solid-state memories. In some embodiments, the memory may optionally include a memory remotely arranged relative to the processor, and the remote memory may be connected to an external device via a network. Examples of the network include, but are not limited to, the Internet, an intranet, a local area network, a mobile communication network, and combinations thereof.

One or more modules are stored in the memory and perform, when executed by one or more processors, the behavior recognition method described in any embodiment described above.

The product described above, which performs the behavior recognition method provided by the embodiments of the present disclosure, is provided with functional modules corresponding to the implementation of the method and can produce beneficial effects. Reference may be made to the behavior recognition method provided by the embodiments of the present disclosure for technical details which are not described in details in the embodiments.

The present disclosure further relates to a computer-readable storage medium configured to store a computer-readable program, which is used by a computer to implement some or all of the embodiments of the behavior recognition method described above.

That is, as can be understood by those of ordinary skill in the art, implementation of all or part of the steps of the method described in the above embodiments may be achieved by a program instructing related hardware, and the program is stored in a storage medium and includes several instructions to enable a device (which may be a single chip, a chip, etc.) or a processor to perform all or part of the steps of the method described in all the embodiments of the present application. The above storage medium includes: a Universal Serial Bus Flash Disk (a USB flash disk), a mobile hard disk, a Read-Only Memory (ROM), a Random Access Memory (RAM), a magnetic disk, an optical disc, or various media capable of storing program codes.

A large number of specific details are given in the Description herein. However, it should be understood that the embodiments of the disclosure may be implemented without those specific details. In some examples, well-known methods, structures and techniques are not specifically illustrated for not obscuring understanding of the Description.

Moreover, it should be understood by those of ordinary skill in the art that, although some embodiments described herein include some features, but not other features, included in other embodiments, the combinations of the features of different embodiments are intended to fall within the scope of the present disclosure and form different embodiments. For example, any one of the claimed embodiments in the claims may be implemented in the form of a combination.

It should be understood by those of ordinary skill in the art that, although the present disclosure is described with reference to exemplary embodiments, various changes can be made to the present disclosure and equivalents can be used to replace the elements described in the present disclosure without departing from the scope of the present disclosure. In addition, if not departing from the essential scope of the present disclosure, many modifications can be made to adapt a particular situation or material to the teachings of the present disclosure. Therefore, the present disclosure is not limited to the specific embodiments disclosed herein, and includes all embodiments that fall within the scope of the appended claims.

What is claimed is:

1. A behavior recognition method, comprising:
dividing video data into a plurality of video clips, performing frame extraction processing on each video clip to obtain a plurality of frame images, and performing optical flow extraction on the plurality of frame images of each video clip obtained after the frame extraction to obtain optical flow images of each video clip;
respectively performing feature extraction on the frame images and the optical flow images of each video clip to obtain feature maps of the frame images of each video clip and feature maps of the optical flow images of each video clip;
respectively performing spatio-temporal convolution processing on the feature maps of the frame images of each video clip and the feature maps of the optical flow images of each video clip, and determining a spatial prediction result and a temporal prediction result of each video clip;
fusing the spatial prediction results of all the video clips to obtain a spatial fusion result, and fusing the temporal prediction results of all the video clips to obtain a temporal fusion result; and
performing two-stream fusion on the spatial fusion result and the temporal fusion result to obtain a behavior recognition result,
wherein respectively performing the spatio-temporal convolution processing on the feature maps of the frame images of each video clip and the feature maps of the optical flow images of each video clip, and determining the spatial prediction result and the temporal prediction result of each video clip comprises:
respectively performing time series feature extraction on the feature maps of the frame images of each video clip and the feature maps of the optical flow images of each video clip for n times to obtain a first eigenvector, with n being a positive integer;
performing matrix transformation processing on the first eigenvector to obtain a second eigenvector;
performing time series full-connection processing on the second eigenvector to obtain a third eigenvector; and
determining the spatial prediction result and the temporal prediction result of each video clip according to the third eigenvector.

2. The behavior recognition method of claim 1, wherein when n=1, respectively performing time series feature extraction on the feature maps of the frame images of each video clip and the feature maps of the optical flow images of each video clip for n times to obtain the first eigenvector comprises:
respectively performing temporal convolution processing on the feature maps of the frame images of each video clip and the feature maps of the optical flow images of each video clip to obtain a first temporal convolution vector;
performing pooling processing on the first temporal convolution vector to obtain a first intermediate eigenvector; and
determining the first intermediate eigenvector as the first eigenvector,
when n=2, respectively performing time series feature extraction on the feature maps of the frame images of each video clip and the feature maps of the optical flow images of each video clip for n times to obtain the first eigenvector comprises:
respectively performing temporal convolution processing on the feature maps of the frame images of each video clip and the feature maps of the optical flow images of each video clip to obtain the first temporal convolution vector;
performing pooling processing on the first temporal convolution vector to obtain the first intermediate eigenvector;
performing temporal convolution processing on the first intermediate eigenvector to obtain a second temporal convolution vector;
performing pooling processing on the second temporal convolution vector to obtain a second intermediate eigenvector; and
determining the second intermediate eigenvector as the first eigenvector,
when n>2, respectively performing time series feature extraction on the feature maps of the frame images of each video clip and the feature maps of the optical flow images of each video clip for n times to obtain the first eigenvector comprises:
respectively performing temporal convolution processing on the feature maps of the frame images of each video clip and the feature maps of the optical flow images of each video clip to obtain the first temporal convolution vector;
performing pooling processing on the first temporal convolution vector to obtain the first intermediate eigenvector;
performing temporal convolution processing on the first intermediate eigenvector to obtain the second temporal convolution vector;

performing pooling processing on an ith temporal convolution vector to obtain an ith intermediate eigenvector;

performing temporal convolution processing on the ith intermediate eigenvector to obtain a $(i+1)^{th}$ temporal convolution vector;

performing pooling processing on the $(i+1)^{th}$ temporal convolution vector to obtain a $(i+1)^{th}$ intermediate eigenvector, and so on, until an nth intermediate eigenvector is obtained, with I being a positive integer sequentially taken from 2 to (n-1); and determining the nth intermediate eigenvector as the first eigenvector.

3. The behavior recognition method of claim 1, wherein performing frame extraction processing on each video clip comprises:

extracting frames from each video clip with a certain interval to obtain Ni frames of images, with the interval being obtained by dividing the total number of frames of the video clip by $N_1$, and $N_1$ being an integer greater than 1.

4. The behavior recognition method of claim 3, wherein performing optical flow extraction on the plurality of frame images of each video clip comprises:

for the extracted Ni frames of images, respectively performing optical flow extraction and calculation on every two adjacent frame images to obtain ($N_1$-1) optical flows; and copying an optical flow of a second frame and a first frame as a first optical flow, and combining the first optical flow with the ($N_1$-1) optical flows to obtain Ni optical flows.

5. The behavior recognition method of claim 1, wherein respectively performing spatio-temporal convolution processing on the feature maps of the frame images of each video clip and the feature maps of the optical flow images of each video clip is implemented by a neural network, and the method further comprises:

training the neural network according to a training set.

6. The behavior recognition method of claim 5, wherein the neural network comprises:

n Blocks, a Reshape layer, an LIF layer, a fully connected layer and a Softmax layer, and each Block comprises a ConvLIF layer and a pooling layer, which are cascaded, n is a positive integer and satisfies n>1, and the n Blocks are cascaded when n>1.

7. The behavior recognition method of claim 6, wherein respectively performing spatio-temporal convolution processing on the feature maps of the frame images of each video clip and the feature maps of the optical flow images of each video clip with the neural network comprises:

performing, by the n Blocks, time series feature extraction on the feature maps of the frame images of each video clip and the feature maps of the optical flow images of each video clip for n times to obtain a first eigenvector, with n being a positive integer;

performing, by the Reshape layer, matrix transformation processing on the first eigenvector to obtain a second eigenvector;

performing, by the LIF layer and the fully connected layer, time series full-connection processing on the second eigenvector to obtain a third eigenvector; and determining, by the Softmax layer, the spatial prediction result and the temporal prediction result of each video clip according to the third eigenvector.

8. The behavior recognition method of claim 7, wherein when n=1, performing, by the n Blocks, time series feature extraction on the feature maps of the frame images of each video clip and the feature maps of the optical flow images of each video clip for n times to obtain the first eigenvector comprises:

respectively performing, by the ConvLIF layer, temporal convolution processing on the feature maps of the frame images of each video clip and the feature maps of the optical flow images of each video clip to obtain a first temporal convolution vector;

performing, by the pooling layer, pooling processing on the first temporal convolution vector to obtain a first intermediate eigenvector; and determining the first intermediate eigenvector as the first eigenvector, when n=2, performing, by the n Blocks, time series feature extraction on the feature maps of the frame images of each video clip and the feature maps of the optical flow images of each video clip for n times to obtain the first eigenvector comprises:

respectively performing, by the ConvLIF layer, temporal convolution processing on the feature maps of the frame images of each video clip and the feature maps of the optical flow images of each video clip to obtain the first temporal convolution vector;

performing, by the pooling layer, pooling processing on the first temporal convolution vector to obtain the first intermediate eigenvector;

performing, by the ConvLIF layer, temporal convolution processing on the first intermediate eigenvector to obtain a second temporal convolution vector;

performing, by the pooling layer, pooling processing on the second temporal convolution vector to obtain a second intermediate eigenvector; and determining the second intermediate eigenvector as the first eigenvector, when n>2, performing, by the n Blocks, time series feature extraction on the feature maps of the frame images of each video clip and the feature maps of the optical flow images of each video clip for n times to obtain the first eigenvector comprises:

respectively performing, by the ConvLIF layer, temporal convolution processing on the feature maps of the frame images of each video clip and the feature maps of the optical flow images of each video clip to obtain the first temporal convolution vector;

performing, by the pooling layer, pooling processing on the first temporal convolution vector to obtain the first intermediate eigenvector;

performing, by the ConvLIF layer, temporal convolution processing on the first intermediate eigenvector to obtain the second temporal convolution vector;

performing, by the pooling layer, pooling processing on an ith temporal convolution vector to obtain an ith intermediate eigenvector;

performing, by the ConvLIF layer, temporal convolution processing on the ith intermediate eigenvector to obtain a $(i+1)^{th}$ temporal convolution vector;

performing, by the pooling layer, pooling processing on the $(i+1)^{th}$ temporal convolution vector to obtain a $(i+1)^{th}$ intermediate eigenvector, and so on, until an nth intermediate eigenvector is obtained, with i being a positive integer sequentially taken from 2 to (n-1); and determining the nth intermediate eigenvector as the first eigenvector.

9. The behavior recognition method of claim 8, wherein each Block further comprises: a Batch Normalization (BN) layer cascaded between the ConvLIF layer and the pooling layer,
when n=1 or n=2, performing, by the pooling layer, pooling processing on the first temporal convolution vector to obtain the first intermediate eigenvector comprises:
performing, by the BN layer, normalizing processing on the first temporal convolution vector; and
performing, by the pooling layer, pooling processing on the normalized first temporal convolution vector,
when n=2, performing, by the pooling layer, pooling processing on the second temporal convolution vector to obtain the second intermediate eigenvector comprises:
performing, by the BN layer, normalizing processing on the second temporal convolution vector; and
performing, by the pooling layer, pooling processing on the normalized second temporal convolution vector,
when n>2, performing, by the pooling layer, pooling processing on the first temporal convolution vector to obtain the first intermediate eigenvector comprises:
performing, by the BN layer, normalizing processing on the first temporal convolution vector; and
performing, by the pooling layer, pooling processing on the normalized first temporal convolution vector to obtain the first intermediate eigenvector,
when n>2, performing, by the pooling layer, pooling processing on the ith temporal convolution vector to obtain the ith intermediate eigenvector comprises:
performing, by the BN layer, normalizing processing on the ith temporal convolution vector; and
performing, by the pooling layer, pooling processing on the normalized ith temporal convolution vector to obtain the ith intermediate eigenvector.

10. The behavior recognition method of claim 8, wherein the ConvLIF layer is configured to:
determine a membrane potential value $U_m^t$ at a moment t according to a value $I^t$, which is obtained by convolution operation or fully connected operation on an input value $X^t$ at the moment t, and a biological voltage value $V_m^{t-1}$ at a moment (t-1);
determine an output value Ft at the moment t according to the membrane potential value $U_m^t$ at the moment t and a transmission threshold $V_{th}$;
determine whether to reset a membrane potential according to the output value Ft at the moment t, and determine a reset membrane potential value $R_m^t$ according to a reset voltage value $V_{reset}$; and
determine a biological voltage value $V_m^t$ at the moment t according to the reset membrane potential value $R_m^t$;
wherein the output value $F^t$ at the moment t is used as an input into a following layer cascaded with the ConvLIF layer, and the biological voltage value $V_m^t$ at the moment t is used as an input for calculating the membrane potential value at a moment (t+1).

11. The behavior recognition method of claim 7, wherein the LIF layer is configured to:
determine a membrane potential value $U_m^t$ at a moment t according to a value $I^t$, which is obtained by fully connected operation on an input value $X^t$ at the moment t, and a biological voltage value $V_m^{t-1}$ at a moment (t-1);
determine an output value $^F$t at the moment t according to the membrane potential value $U_m^t$ at the moment t and a transmission threshold $V_{th}$;
determine whether to reset a membrane potential according to the output value $F^t$ at the moment t, and determine a reset membrane potential value $R_m^t$ according to a reset voltage value $V_{reset}$; and
determine a biological voltage value $V_m^t$ at the moment t according to the reset membrane potential value $R_m^t$;
wherein the output value $F^t$ at the moment t is used as an input into a following layer cascaded with the LIF layer, and the biological voltage value $V_m^t$ at the moment t is used as an input for calculating the membrane potential value at a moment (t+1).

12. The behavior recognition method of claim 11, wherein determining the output value $F^t$ at the moment t according to the membrane potential value $U_m^t$ at the moment t and the transmission threshold $V_{th}$ comprises:
in a case where the membrane potential value $U_m^t$ at the moment t is greater than or equal to the transmission threshold $V_{th}$, determining that the output value $F^t$ at the moment t is 1; and
in a case where the membrane potential value $U_m^t$ at the moment t is less than the transmission threshold $V_{th}$, determining that the output value $F^t$ at the moment t is 0.

13. The behavior recognition method of claim 11, wherein determining the biological voltage value $V_m^t$ at the moment t according to the reset membrane potential value $R_m^t$ comprises:
calculating the reset membrane potential value $R_m^t$ by a Leak activation function, and determining the biological voltage value $V_m^t$ at the moment t.

14. The behavior recognition method of claim 1, wherein when the spatial prediction results of all the video clips are fused and the temporal prediction results of all the video clips are fused, the prediction results of all the video clips are subjected to one of the following:
direct averaging, linear weighting, direct taking of a maximum value, and TOP-K weighting.

15. The behavior recognition method of claim 1, wherein when the spatial fusion result and the temporal fusion result are subjected to two-stream fusion, the spatial fusion result and the temporal fusion result are weighted fused.

16. An electronic device, comprising a memory and a processor, wherein the memory is configured to store one or more computer instructions, which are executed by the processor to implement the behavior recognition method of claim 1.

17. A non-transient transitory computer-readable storage medium having thereon stored a computer program, which is executed by a processor to implement the behavior recognition method of claim 1.

18. A behavior recognition system, comprising:
a data preprocessing module configured to divide video data into a plurality of video clips, perform frame extraction processing on each video clip to obtain a plurality of frame images, and perform optical flow extraction on the plurality of frame images of each video clip to obtain a plurality of optical flow images of each video clip;
a feature extraction module configured to respectively perform feature extraction on the frame images and the optical flow images of each video clip to obtain feature maps of the frame images of each video clip and feature maps of the optical flow images of each video clip;
a network identification module configured to respectively perform spatio-temporal convolution processing on the feature maps of the frame images of each video clip and the feature maps of the optical flow images of each video clip, and determine a spatial prediction result and a temporal prediction result of each video clip;

a network fusion module configured to fuse the spatial prediction results of all the video clips to obtain a spatial fusion result, and fuse the temporal prediction results of all the video clips to obtain a temporal fusion result; and a two-stream fusion module configured to perform two-stream fusion on the spatial fusion result and the temporal fusion result to obtain a behavior recognition result, wherein respectively performing, by the network identification module, spatio-temporal convolution processing on the feature maps of the frame images of each video clip and the feature maps of the optical flow images of each video clip, and determining the spatial prediction result and the temporal prediction result of each video clip comprises:

respectively performing time series feature extraction on the feature maps of the frame images of each video clip and the feature maps of the optical flow images of each video clip for n times to obtain a first eigenvector, with n being a positive integer;

performing matrix transformation processing on the first eigenvector to obtain a second eigenvector;

performing time series full-connection processing on the second eigenvector to obtain a third eigenvector; and determining the spatial prediction result and the temporal prediction result of each video clip according to the third eigenvector.

* * * * *